United States Patent Office 3,409,621
Patented Nov. 5, 1968

3,409,621
PIPERAZINO-AZA-DIBENZO-[a,d]-
CYCLOHEPTENES
Frank J. Villani, West Caldwell, N.J., assignor to Schering Corporation, Bloomfield, N.J., a corporation of New Jersey
No Drawing. Filed Apr. 1, 1966, Ser. No. 539,272
9 Claims. (Cl. 260—268)

ABSTRACT OF THE DISCLOSURE

Aza 5 piperazino dibenzo[a,d]cycloheptenes having anti-histaminic activity are described.

---

This invention relates to novel compositions of matter classifiable in the field of organic chemistry as aza-5-piperazino-dibenzo - [a,d] - cycloheptenes and to novel methods of preparing and using such compositions. More particularly this invention relates to aza-5-piperazino-dibenzo-[a,d]-cycloheptenes and their 10,11-dihydro analogs having attached to the 1-position of the piperazine moiety a substituent selected from the group consisting of hydrogen, lower alkyl, hydroxy-lower alkyl and benzyl, and to methods of preparing such compositions, and to methods of employing such compositions in the application of antihistaminic therapy.

In one of its composition aspects, the instant invention may be described as residing in the concept of a chemical compound having the molecular structure of an aza-5-piperazino-dibenzo-[a,d]-cycloheptene, and the 10,11-dihydro analog thereof, having on the 1-position of the piperazine moiety a substituent selected from the group consisting of hydrogen, lower alkyl, hydroxy-lower alkyl and benzyl.

In another of its composition aspects this invention may be described as residing in the concept of therapeutic formulations, for the application of antihistaminic therapy, containing as the essential active ingredient a tangible embodiment of the composition aspect described above.

In one of its process aspects the instant invention may be described as residing in the concept of preparing an aza-5-piperazino-dibenzo - [a,d] - cycloheptene, and the 10,11-dihydro analog thereof, having on the 1-position of the piperazine moiety a substituent selected from the group consisting of lower alkyl, hydroxy lower alkyl and benzyl by condensing an aza-5-halo-dibenzo-[a,d]-cycloheptene in an inert organic solvent, in the presence of a basic condensing agent, with a piperazine bearing a 1-substituent selected from the group consisting of lower alkyl, hydroxy lower alkyl and benzyl.

In another of its process aspects this invention may be described as residing in the concept of preparing an aza-5-piperazino-dibenzo-[a,d]-cycloheptene, and the 10,11-dihydro analog thereof, by condensing an aza-5-halo-dibenzo-[a,d]-cycloheptene with carbethoxy piperazine in an inert organic solvent in the presence of a basic condensing agent, removing the carbethoxy group by saponification thereby yielding the unsubstituted piperazine.

In yet another of its process aspects, this invention may be described as residing in the concept of a method for achieving an antihistaminic response which comprises administering dosage units of therapeutic formulations containing as the essential active ingredient an aza-5-piperazino-dibenzo-[a,d]-cycloheptene as defined above.

The tangible embodiments of the composition aspect of this invention possess the applied use characteristic of exerting an antihistaminic effect when administered to animals displaying histamine induced allergic reactions.

The tangible embodiments of the instant invention may be described as compounds having the following formula:

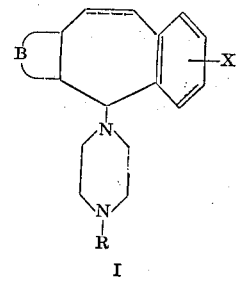

I wherein B together with the carbon atoms to which it is attached represents a fused pyridine ring wherein the pyridine nitrogen may occupy any of the 1-, 2-, 3- or 4-positions; X represents hydrogen, chlorine, bromine, trifluoromethyl, lower alkyl and lower alkoxy and may occupy any of the available positions of the benzenoid moiety; the dotted line between positions 10 and 11 of the cycloheptene moiety represents a facultative double bond; and R is either hydrogen, lower alkyl, hydroxy-lower alkyl or benzyl.

The preferred embodiments of the instant invention are those compounds wherein X is 8-chloro and R is methyl, and wherein X is hydrogen, R is β-hydroxyethyl and in each case B is 4-aza.

As used herein, the term, "lower alkyl," means saturated hydrocarbon radicals of 1 to 6 carbon atoms and embraces both straight and branched chain groups such as, for example, methyl, ethyl, propyl, isobutyl, 2-methyl-pentyl and the like. The term "lower alkoxy," as used herein is similarly defined as having 1 to 6 carbon atoms as exemplified by methoxy, ethoxy, propoxy, isobutoxy, 2-methyl pentoxy and the like. The term "hydroxy lower alkyl," as used herein includes alkyl groups having from 1 to 6 carbon atoms in the hydrocarbon chain as represented by 2-hydroxyethyl, 3-hydroxypropyl, 2-hydroxy 3-methylbutyl, 5-hydroxypentyl and the like.

The basic condensing agents employed in the process aspect of this invention are agents well-known in the are for this purpose and include such compounds as alkali metal alkoxides, alkali metal hydrides, alkali metal carbonates and alkali metal amides. Exemplary of such basic condensing agents are potassium tertiary butoxide, sodium methoxide, sodium hydride, potassium carbonate and sodium amide.

The manner and process of making and using this invention will now be described generally so as to enable a person skilled in the art of chemistry to make and use the same.

The starting materials used to prepare the novel compounds of this invention are aza-5-halo-dibenzo-[a,d]-cycloheptenes and the 10,11-dihydro analogs thereof. As the halo substituent at the 5-position there may be used any halogen having an atomic weight greater than 19, preferably chlorine. These starting materials are readily prepared from the corresponding 5-hydroxy compounds which themselves are derived from the corresponding 5-oxo derivatives. The 5-oxo derivatives are well-known in the art being described in Belgian Patent No. 647,043.

To prepare the 5-carbinols (i.e. aza-5-hydroxy-dibenzo-[a,d]-cycloheptenes and the aza-5-hydroxy-10,11-dihydro-dibenzo-[a,d]-cycloheptenes), the corresponding 5-oxo compound (i.e. aza-5-oxo-10,11-dihydro-dibenzo-[a,d]-cycloheptene) is treated with a reducing agent such as an alkali metal borohydride (sodium or lithium or potassium borohydride, for example) in the presence of a non-reactive organic solvent such as dioxane, tetrahydrofuran, methanol, ethanol and the like. By "non-reactive organic solvent" is meant one which is essentially inert to the contained reactants. The reduction is preferably carried out in methanol using sodium borohydride and at a temperature ranging from 0° to 5° C. and usually requires about 1 to 3 hours to complete. The carbinols are isolated by any one of the conventional techniques (i.e. precipitation, extraction, concentration and the like).

The carbinols, in an anhydrous state, are subjected to the replacement of the hydroxyl group by halogen. This replacement is advantageously performed by the utilization of a reagent of the type exemplified by thionyl chloride in a nonreactive solvent such as benzene.

Although the above general method indicated the use of thionyl chloride, it is obvious that other reagents could be utilized. Exemplary of the classes of reagents known to be suitable are the hydrogen halides, hydrogen chloride or bromide for example, phosphorous halides, phosphorous pentachloride, for example, or phosphorous oxyhalides, phosphorous oxychloride, for example.

Effective solvents for this replacement reaction are varied and almost any solvent may be used subject to the conditions that it is inert to the reagents and that they possess a reasonable solubility therein. Such solvents as benzene, toluene, tetrahydrofuran, dioxane and isobutyl ether may be used.

The aza-5-halo-dibenzo-[a,d]-cycloheptenes as their acid addition salts prepared as described above are usually suitable for further processing without additional purification.

From the foregoing it can be seen that by employing the appropriately substituted aza-5-oxo-dibenzo-[a,d]-cycloheptene or its 10,11-dihydro analog in the above reaction, 5-carbinols can be prepared which upon replacement with halogen give rise to products of which the following are exemplary:

4 - aza - 5,8 - dichloro - 10,11 - dihydrodibenzo - [a,d] - cycloheptene
3 - aza - 5,8 - dichloro - 10,11 - dihydrodibenzo - [a,d] - cycloheptene
2 - aza - 5,8 - dichloro - 10,11 - dihydrodibenzo - [a,d] - cycloheptene
1 - aza - 5,8 - dichloro - 10,11 - dihydrodibenzo - [a,d] - cycloheptene
4-aza-5,8-dichloro-dibenzo-[a,d]-cycloheptene
3-aza-5,8-dichloro-dibenzo-[a,d]-cycloheptene
2-aza-5,8-dichloro-dibenzo-[a,d]-cycloheptene
1-aza-5,8-dichloro-dibenzo-[a,d]-cycloheptene
4-aza-5-chloro-dibenzo-[a,d]-cycloheptene
3-aza-5-chloro-dibenzo-[a,d]-cycloheptene
2-aza-5-chloro-dibenzo-[a,d]-cycloheptene
1-aza-5-chloro-dibenzo-[a,d]-cycloheptene
4 - aza - 5 - chloro - 7,8 - dimethoxy - 10,11 - dihydro - dibenzo-[a,d]-cycloheptene
4 - aza - 5,7 - dichloro - 10,11 - dihydrodibenzo - [a,d] - cycloheptene
3 - aza - 5,7 - dichloro - 10,11 - dihydrodibenzo - [a,d] - cycloheptene
2 - aza - 5,7 - dichloro - 10,11 - dihydrodibenzo - [a,d] - cycloheptene
1 - aza - 5,7 - dichloro - 10,11 - dihydrodibenzo - [a,d] - cycloheptene
4 - aza - 5 - bromo - 7 - methyl - 10,11 - dihydrodibenzo - [a,d]-cycloheptene
3 - aza - 5 - bromo - 7 - methyl - 10,11 - dihydrodibenzo - [a,d]-cycloheptene
2 - aza - 5 - bromo - 7 - methyl - 10,11 - dihydrodibenzo - [a,d]-cycloheptene
1 - aza - 5 - bromo - 7 - methyl - 10,11 - dihydrodibenzo - [a,d]-cycloheptene The tangible embodiments of this invention bearing either lower alkyl, hydroxy lower alkyl, or benzyl on the 1-position of the piperazine moiety are generally prepared by the condensation of aza-5-halo-dibenzo-[a,d]-cycloheptene or its 10,11-dihydro analog with a piperazine bearing the requisite substituent at its 1-position as follows:

An aza-5-chloro-dibenzo-[a,d]-cycloheptene (II) is treated at reflux in suitable solvent, such as xylene, in the presence of a basic condensing agent, such as potassium carbonate, with a 1-substituted piperazine, such as methylpiperazine (III) for approximately 15-20 hours to yield product IV.

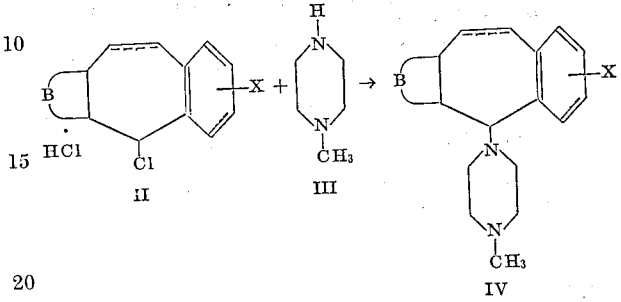

In general, the tangible embodiments of the instant invention wherein R is hydrogen are prepared as follows: An aza-5-chloro-dibenzo-[a,d]-cycloheptene or its 10,11-dihydro analog (II) is heated at reflux with stirring in a suitable solvent with carbethoxy piperazine (V) under the influence of a basic condensing agent such as sodium amide. The heating is maintained for approximately 15-20 hours and the product (VI) isolated therefrom. Product (VI) is treated on a steam bath with an alcohol-water solution of sodium hydroxide for approximately 6-8 hours. The solvents are distilled therefrom and the product (VII) obtained.

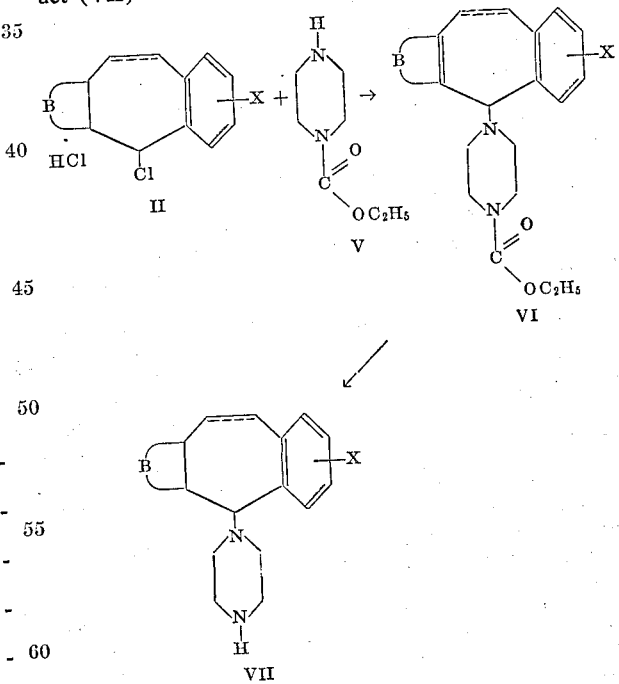

It is apparent that other amine blocking groups, benzyl for example, may be utilized in place of carbalkoxy. The groups also are easily removed from the piperazine moiety after the alkalation step.

An alternate process for the preparation of the tangible embodiments of this invention bearing either lower alkyl, hydroxy lower alkyl or benzyl substituents on the piperazine moiety, utilizes an alkylation step on compound VII. This alkylation is readily accomplished by treatment of VII with an alkylating agent such as an alkyl halide, benzyl halide, hydroxy alkyl halide or alkylene oxide or an alkylene chlorohydrin in a suitable solvent, such as benzene, in the presence of a basic condensing agent such as sodium hydride for 15–20 hours at reflux and isolating the product therefrom.

The tangible embodiments of the instant invention can be administered orally in the form of tablets, capsules, elixirs, and the like. They may be compounded with inert pharmaceutical carriers which may contain a suitable binder such as, for example, gums, starches and sugars. They may also be incorporated into a gelatin capsule and also formulated into elixirs which have the advantage of being susceptible to manipulations in flavor by the addition of standard natural or synthetic flavoring materials. It is often desirable that these tangible embodiments be used in the form of their nontoxic pharmaceutically acceptable acid addition salts of organic and inorganic acids. The salts are formed by the addition of maleic, tartaric, citric, hydrochloric, sulfuric and phosphoric acids to a solution of the free base in a solvent such as ether. These salts have the property of enhancing the water solubility of the embodiments of the instant invention and may thereby be used to advantage in the preparation of suspensions, elixirs, and solutions.

The following examples will serve to further illustrate the instant invention.

Preparation 1.—4-aza-5-chloro-10,11-dihydro-dibenzo-[a,d]-cycloheptene hydrochloride Dissolve 24.5 g. of 4-aza-5-hydroxy-10,11-dihydro-dibenzo-[a,d]-cycloheptene in 250 ml. of dry benzene. Adjust the solution temperature to 0°–5° C. with stirring. Add dropwise at 0° to 5° C. a solution of 15 ml. of freshly distilled thionyl chloride in 15 ml. of dry benzene. Stir the mixture with temperature control at 0°–5° C. for 3–4 hours then add approximately 800–900 ml. of anhydrous ethyl ether to precipitate the product. Filter the precipitated product quickly and dry to obtain the product of this example.

Example 1.—4-aza-5-(1-methyl-4-piperazino)-10,11-dihydro-dibenzo-[a,d]-cycloheptene Dissolve 15.8 grams of 4-aza-5-chloro-10,11-dihydro-dibenzo-[a,d]-cycloheptene hydrochloride (Preparation 1) in 250 ml. of xylene. Add 5 grams of 1-methyl-piperazine to the solution thus prepared and 20.7 grams of anhydrous potassium carbonate. Stir the reaction mixture at reflux for 15–20 hours. Cool the reaction mixture to room temperature and filter off the inorganic salts.

Concentrate the filtrate under reduced pressure to remove the solvent then distill in vacuo to obtain the product of this example.

By employing the appropriately substituted aza-5-halo dibenzo-[a,d]-cycloheptene or its 10,11-dihydro analog in the foregoing reaction, products of which the following are exemplary are prepared:

3-aza-5-(1-methyl-4-piperazino)-10,11-dihydro-dibenzo-[a,d]-cycloheptene
2-aza-5-(1-methyl-4-piperazino)-10,11-dihydro-dibenzo-[a,d]-cycloheptene
1-aza-5-(1-methyl-4-piperazino)-10,11-dihydro-dibenzo-[a,d]-cycloheptene
4-aza-5-(1-methyl-4-piperazino)-dibenzo-[a,d]-cycloheptene
3-aza-5-(1-methyl-4-piperazino)-dibenzo-[a,d]-cycloheptene
2-aza-5-(1-methyl-4-piperazino)-dibenzo-[a,d]-cycloheptene
1-aza-5-(1-methyl-4-piperazino)-dibenzo-[a,d]-cycloheptene
4-aza-5-(1-methyl-4-piperazino)-8-chloro-dibenzo-[a,d]-cycloheptene
3-aza-5-(1-methyl-4-piperazino)-8-chloro-dibenzo-[a,d]-cycloheptene
2-aza-5-(1-methyl-4-piperazino)-8-chloro-dibenzo-[a,d]-cycloheptene
1-aza-5-(1-methyl-4-piperazino)-8-chloro-dibenzo-[a,d]-cycloheptene
4-aza-5-(1-methyl-4-piperazino)-8-chloro-10,11-dihydro-dibenzo-[a,d]-cycloheptene
3-aza-5-(1-methyl-4-piperazino)-8-chloro-10,11-dihydro-dibenzo-[a,d]-cycloheptene
2-aza-5-(1-methyl-4-piperazino)-8-chloro-10,11-dihydro-dibenzo-[a,d]-cycloheptene
1-azo-5-(1-methyl-4-piperazino)-8-chloro-10,11-dihydro-dibenzo-[a,d]-cycloheptene
4-aza-5-(1-methyl-4-piperazino)-7-methoxy-10,11-dihydro-dibenzo[a,d]-cycloheptene
3-aza-5-(1-methyl-4-piperazino)-7-methoxy-10,11-dihydro-dibenzo-[a,d]-cycloheptene
2-aza-5-(1-methyl-4-piperazino)-7-methoxy-10,11-dihydro-dibenzo-[a,d]-cycloheptene
1-aza-5-(1-methyl-4-piperazino)-7-methoxy-10,11-dihydro-dibenzo-[a,d]-cycloheptene
4-aza-5-(1-methyl-4-piperazino)-7-methoxy-dibenzo-[a,d]-cycloheptene
3-aza-5-(1-methyl-4-piperazino)-7-methoxy-dibenzo-[a,d]-cycloheptene
2-aza-5-(1-methyl-4-piperazino)-7-methoxy-dibenzo-[a,d]-cycloheptene
1-aza-5-(1-methyl-4-piperazino)-7-methoxy-dibenzo-[a,d]-cycloheptene
4-aza-5-(1-methyl-4-piperazino)-7-methyl-10,11-dihydro-dibenzo-[a,d]-cycloheptene
3-aza-5-(1-methyl-4-piperazino)-7-methyl-10,11-dihydro-dibenzo-[a,d]-cycloheptene
2-aza-5-(1-methyl-4-piperazino)-7-methyl-10,11-dihydro-dibenzo-[a,d]-cycloheptene
1-aza-5-(1-methyl-4-piperazino)-7-methyl-10,11-dihydro-dibenzo-[a,d]-cycloheptene
4-aza-5-(1-methyl-4-piperazino)-7-methyl-dibenzo-[a,d]-cycloheptene
3-aza-5-(1-methyl-4-piperazino)-7-methyl-dibenzo-[a,d]-cycloheptene
2-aza-5-(1-methyl-4-piperazino)-7-methyl-dibenzo-[a,d]-cycloheptene
1-aza-5-(1-methyl-4-piperazino)-7-methyl-dibenzo-[a,d]-cycloheptene
4-aza-5-(1-methyl-4-piperazino)-8-trifluoromethyl-dibenzo-[a,d]-cycloheptene
3-aza-5-(1-methyl-4-piperazino)-8-trifluoromethyl-dibenzo-[a,d]-cycloheptene
2-aza-5-(1-methyl-4-piperazino)-8-trifluoromethyl-dibenzo-[a,d]-cycloheptene
1-aza-5-(1-methyl-4-piperazino)-8-trifluoromethyl-dibenzo-[a,d]-cycloheptene
4-aza-5-(1-methyl-4-piperazino)-8-trifluoromethyl-10,11-dihydro-dibenzo-[a,d]-cycloheptene
3-aza-5-(1-methyl-4-piperazino)-8-trifluoromethyl-10,11-dihydro-dibenzo-[a,d]-cycloheptene
2-aza-5-(1-methyl-4-piperazino)-8-trifluoromethyl-10,11-dihydro-dibenzo-[a,d]-cycloheptene
1-aza-5-(1-methyl-4-piperazino)-8-trifluoromethyl-10,11-dihydro-dibenzo-[a,d]-cycloheptene Example 2.—4-aza-5-piperazino-8-chloro-10,11-dihydro-dibenzo-[a,d]-cycloheptene Dissolve 15.7 grams of 4-aza-5,8-chloro-10,11-dihydro-dibenzo-[a,d]-cycloheptene hydrochloride, 7.9 grams of 1-carbethoxy piperazine and 2.7 grams of sodium amide in 500 ml. of toluene with stirring and heating. Bring the solution to reflux and hold for 18 hours with stirring. Cool the solution and filter to remove the inorganic salts. Concentrate the filtrate under reduced pressure to remove the solvent leaving the product as a residue. Dissolve the residue in a solution of sodium hydroxide (15 grams) in 200 ml. of a 1:1 mixture of ethanol and water. Heat the resulting solution at reflux for 6–8 hours. Remove the solvents under reduced pressure and recrystallize from benzene obtaining the product of this example.

By employing the appropriately substituted 5-halo-aza-dibenzo-[a,d]-cycloheptene or its 10,11-dihydro analog in the foregoing reaction, products of which the following are exemplary are prepared:

4-aza-5-piperazino-7-bromo-dibenzo-[a,d]-cycloheptene
1-aza-5-piperazino-8-methoxy-10,11-dihydro-[a,d]cycloheptene
3-aza-5-piperazino-7-trifluoromethyl-dibenzo-[a,d]-cycloheptene
4-aza-5-piperazino-8-methyl-dibenzo-[a,d]-cycloheptene
2-aza-5-piperazino-9-chloro-dibenzo-[a,d]-cycloheptene
1-aza-5-piperazino-6-methyl-10,11-dihydro-dibenzo-[a,d]-cycloheptene
3-aza-5-piperazino-6-methoxy-dibenzo-[a,d]-cycloheptene
4-aza-5-piperazino-6-trifluoromethyl-10,11-dihydro-dibenzo-[a,d]-cycloheptene
2-aza-5-piperazino-9-chloro-10,11-dihydrodibenzo-[a,d]-cycloheptene Example 3.—4-aza-5-(1-benzyl-4-piperazino)-8-chloro-10,11-dihydro-dibenzo-[a,d]-cycloheptene Dissolve 6.2 grams of the product of Example 2 in benzene. Add 2.5 grams of benzyl chloride and 0.5 gram of sodium hydride to the solution and heat the mixture to reflux. Continue the reflux for 6–8 hours then cool and filter. Concentrate the filtrate under reduced pressure to remove the solvent then distill to obtain the product of this example. Utilizing this process with the appropriately substituted 5 - piperazino-aza - 10,11-dihydro-dibenzo-[a,d]-cycloheptene, or its 10,11-dihydro analog, products of which the following are exemplary are prepared:

3-aza-5-(1-benzyl-4-piperazino)-8-chloro-10,11-dihydro-dibenzo-[a,d]-cycloheptene
4-aza-5-(1-benzyl-4-piperazino)-7-bromo-10,11-dihydro-dibenzo-[a,d]-cycloheptene
1-aza-5-(1-benzyl-4-piperazino)-6-methoxy-dibenzo-[a,d]-cycloheptene
4-aza-5-(1-benzyl-4-piperazino)-9-trifluoromethyl-10,11-dihydro-dibenzo-[a,d]-cycloheptene
2-aza-5-(1-benzyl-4-piperazino)-7-methyl-dibenzo-[a,d]-cycloheptene
3-aza-5-(1-benzyl-4-piperazino)-10,11-dihydro-dibenzo-[a,d]-cycloheptene
1-aza-5-(1-benzyl-4-piperazino)-10,11-dihydro-dibenzo-[a,d]-cycloheptene By utilizing other alkylating agents such as ethylene chlorohydrin, propyl chloride, and others described heretofore, on the products of Example 2, and following the N-alkylation procedure of Example 3, tangible embodiments of which the following are exemplary are prepared:

4-aza-5-[1-(2-hydroxyethyl-4-piperazino)]-6-methoxy-10,11-dihydro-dibenzo-[a,d]-cycloheptene
2-aza-5-(1-propyl-4-piperazino)-dibenzo-[a,d]-cycloheptene
1-aza-5-[1-(2-hydroxyethyl-4-piperazino)]-7-chloro-10,11-dihydro-[a,d]-cycloheptene
3-aza-5-(1-ethyl-4-piperazino)-9-methyl-dibenzo-[a,d]-cycloheptene
2-aza-5-[1-(3-hydroxypropyl)-4-piperazino]-10,11-dihydro-dibenzo-[a,d]-cycloheptene
4-aza-5-(1-methyl-4-piperazino)-7-trifluoromethyl-10,11-dihydro-dibenzo-[a,d]-cycloheptene
1-aza-5-(1-ethyl-4-piperazino)-dibenzo-[a,d]-cycloheptene
3-aza-5-[1-(3-hydroxypropyl)-4-piperazino]-7-bromo-10,11-dihydro-dibenzo-[a,d]-cycloheptene
2-aza-5-(1-propyl-4-piperazino)-9-ethoxy-dibenzo-[a,d]-cycloheptene The subject matter which applicant regards as his invention is particularly pointed out and distinctly claimed as follows.

I claim:
1. A member of the group consisting of aza-dibenzo-[a,d]-cycloheptenes of the formula:

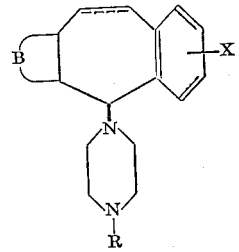

and the non-toxic pharmaceutically acceptable acid addition salts thereof,
wherein B together with the carbon atoms to which it is attached is a fused pyridine ring; X is selected from the group consisting of hydrogen, chlorine, bromine, trifluoromethyl, lower alkyl and lower alkoxy; the dotted line is a faculatative double bond; and R is selected from the group consisting of hydrogen, lower alkyl, hydroxy lower alkyl and benzyl.

2. The compound of claim 1 having the molecular structure, 4-aza - 5 - piperazino-8-chloro-10,11-dihydro-dibenzo-[a,d]-cycloheptene.

3. The compound of claim 1 having the molecular structure 4 - aza - 5-[1-(2-hydroxyethyl)-4-piperazino]-8-chloro-10,11-hydro-dibenzo-[a,d]-cycloheptene.

4. The compound of claim 1 having the molecular structure, 4 - aza - 5-(1-benzyl-4-piperazino)-8-chloro-10,11-dihydro-dibenzo-[a,d]-cycloheptene.

5. The compound of claim 1 having the molecular structure, 4 - aza - 5-(1-methyl-4-piperazino)-7-trifluoromethyl-10,11-dihydro.

6. The compound of claim 1 having the molecular structure 4 - aza - 5-[1-(2-hydroxypropyl)-4-piperazino]-10,11,dihydro-dibenzo-[a,d]-cycloheptene.

7. The compound of claim 1 having the molecular structure 4 - aza - 5-piperazino-8-chloro-dibenzo-[a,d]-cycloheptene.

8. The compound of claim 1 having the molecular structure, 4 - aza - 5-[1-(2-hydroxyethyl)-4-piperazino]-8-chloro-dibenzo-[a,d]-cycloheptene.

9. The compound of claim 1 having the molecular structure, 4 - aza - 5-(1-benzyl-4-piperazino)-10,11-dihydro-dibenzo-[a,d]-cycloheptene.

References Cited
UNITED STATES PATENTS

| | | | |
|---|---|---|---|
| 3,167,541 | 1/1965 | Van Der Stelt | 260—268 X |
| 3,257,404 | 6/1966 | Fouche | 260—268 |
| 3,366,635 | 1/1968 | Villani | 260—290 |

NICHOLAS S. RIZZO, Primary Examiner.

D. G. DAUS, Assistant Examiner.